United States Patent [19]
Jones et al.

[11] Patent Number: 6,044,407
[45] Date of Patent: *Mar. 28, 2000

[54] INTERFACE FOR TRANSLATING AN INFORMATION MESSAGE FROM ONE PROTOCOL TO ANOTHER

[75] Inventors: Philip Stephen Jones; David Scott Murray, both of Suffolk, United Kingdom

[73] Assignee: British Telecommunications public limited company, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/139,692

[22] Filed: Oct. 22, 1993

[30] Foreign Application Priority Data

Nov. 13, 1992 [EP] European Pat. Off. .............. 92310409

[51] Int. Cl.[7] ...................................... G06F 13/00
[52] U.S. Cl. .......................... 709/246; 709/100; 709/230; 709/300
[58] Field of Search .............................. 706/45; 707/100, 707/104; 709/100, 106, 200, 230, 246, 250, 300; 345/527

[56] References Cited

U.S. PATENT DOCUMENTS

| | | | |
|---|---|---|---|
| 4,607,256 | 8/1986 | Henzel | 340/825.52 |
| 4,751,635 | 6/1988 | Kret | 395/600 |
| 4,787,035 | 11/1988 | Bourne | 395/82 |

(List continued on next page.)

FOREIGN PATENT DOCUMENTS

| | | |
|---|---|---|
| 0434865 | of 1989 | European Pat. Off. . |
| 2-271754 | 11/1990 | Japan . |
| 3-73049 | 3/1991 | Japan . |
| 4-199933 | 7/1992 | Japan . |
| 4-248724 | 9/1992 | Japan . |
| 4-273634 | 9/1992 | Japan . |
| 4-305752 | 10/1992 | Japan . |
| 5-252159 | 9/1993 | Japan . |
| 7-503117 | 3/1995 | Japan . |

OTHER PUBLICATIONS

Willets, "Cooperative Management: The Key to Managing Customer Networks", British Telecommunications Engineering, vol. 10, Oct. 1991 (pp. 174–179).

Research Reports of the Information Processing Society, MIC–68–3, Jul. 5, 1991 (pp. 1–8) (Japanese lang).

Technical Research Reports of the Institute of Electronics, Information and Communications Engineering, IN93–131, Feb. 25, 1994, pp. 87–94.

(List continued on next page.)

Primary Examiner—Viet D. Vu
Attorney, Agent, or Firm—Nixon & Vanderhye P.C.

[57] ABSTRACT

A computer implemented interface for interfacing an equipment controller to an equipment manager each arranged to respond to a reproduced text messages according to a first and second protocol, respectively. The interface comprises a number of program modules (502–514) which each receive one or more inputs and produce an output dependent on whether defined conditions are met by the inputs. A number of the outputs of the program modules constitute inputs to other program modules therefore defining a network. A number of the program modules (502–508) are of the type which is responsive to a predefined text in a respective field of an input message to produce an output to a further program module which is responsive to a further predefined text in another field which is valid in a first protocol in the context of the predefined text. The network of program modules produces a series of outputs which represent the information content of the original input message. These outputs are then passed to a further series of modules which format a translation of the input message. The defined conditions of the program modules are modifiable and in particular are modifiable in a manner which is dependent on the state of part of the equipment management system thereby providing an inherent model of the network management system for use during parsing of an input message.

7 Claims, 10 Drawing Sheets

U.S. PATENT DOCUMENTS

| | | | |
|---|---|---|---|
| 4,930,071 | 5/1990 | Tou et al. ................................. | 395/600 |
| 4,968,159 | 11/1990 | Sasaki et al. ............................ | 395/112 |
| 4,992,957 | 2/1991 | Aoyama et al. ......................... | 395/112 |
| 5,021,992 | 6/1991 | Kondo ...................................... | 395/54 |
| 5,060,140 | 10/1991 | Brown et al. ............................ | 395/325 |
| 5,063,523 | 11/1991 | Vrenjak .................................... | 364/514 |
| 5,086,426 | 2/1992 | Tsukakoshi et al. . | |
| 5,136,523 | 8/1992 | Landers .................................... | 395/54 |
| 5,146,594 | 9/1992 | Iitsuka ...................................... | 395/700 |
| 5,165,014 | 11/1992 | Vassar ...................................... | 395/112 |
| 5,172,313 | 12/1992 | Schumacher ............................ | 364/401 |
| 5,278,978 | 1/1994 | Demers et al. .......................... | 395/600 |
| 5,301,303 | 4/1994 | Abraham et al. . | |
| 5,452,433 | 9/1995 | Nihart et al. . | |
| 5,471,399 | 11/1995 | Tanaka et al. . | |
| 5,490,252 | 2/1996 | Maura et al. . | |
| 5,491,796 | 2/1996 | Wanderer et al. . | |
| 5,613,100 | 3/1997 | Anezaki . | |

OTHER PUBLICATIONS

Technical Research Reports of the Institute of Electronics, Information and Communications Engineering, IN92–63, Oct. 19, 1992, pp. 19–24.

Kannai et al, "Method of Translation of Management Information and Protocol in Integrated Network Management System", Papers for National Meeting of the Information Processing Society, Mar. 1992, No. 1, pp. 1–109 through 1–110.

Warrier et al, "A Platform for Heterogeneous Interconnecting Network Management", IEEE Journal on Selected Areas in Communications, p. 119–26, Jan. 1990.

Chow et al, "Achieving Multimedia Communications on a Heterogeneous Network", IEEE Journal on Selected Areas in Communications, p. 348–59, Apr. 1990.

JPO Official Action dated Sep. 22, 1998.

Oleksiw, "LAN Internetwork Management", IEEE 1992 Network Operations and Management Symposium, New York, US, pp. 556–565, 1992.

Yoda et al, "Configuration of a Local Fiber Optical Network Management System based on Multiple Manager Systems Environment", IEEE 1992 Network Operations and Management Symposium, New York, US, pp. 731–741.

Reasoner, "Management by Proxy Agent", IRE Wescon Convention Record, vol. 35, Nov. 1991, North Hollywood, US, pp. 190–195.

Cox et al, "SNMP Agent Support for SMDS", IEEE Network: The Magazine of Computer Communications, vol. 5, No. 5, Sep. 1991, New York, US, pp. 33–40.

Kauffels, "Schwaches Konzept, Aber Produkte—Und Umgekehrt", Technische Rundschau, vol. 83, No. 24, Jun 14, 1991, Bern, CH, pp. 40–50.

Modiri, "An Implementation of the Common Network Management Information Service Element Interfaces", IEEE Communications Magazine, vol. 29, No. 7, Jul. 1991, Piscataway, NJ, US. pp. 29–38.

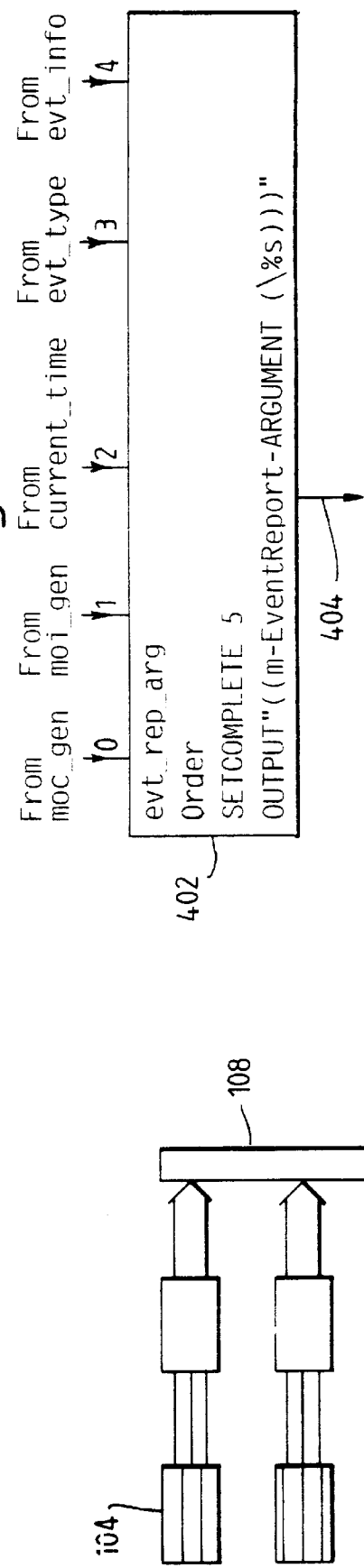
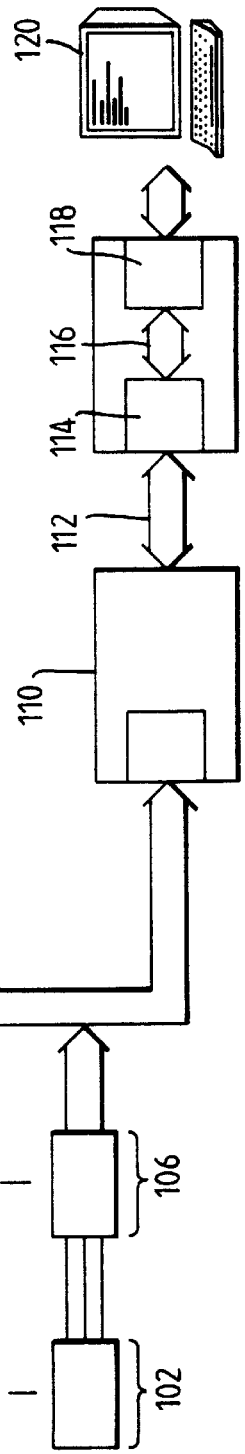
Fig.4.
Fig.1.

Fig.2.

INPUT MESSAGE

"evt:2:data:1:14.15:2/9/92"

200  202  204  206  208

OUTPUT MESSAGE

```
((m-EventReport-ARGUMENT (
    (managedObjectClass "highPoweredAmplifier")
    (managedObjectInstance (
       (((attributeid networkID)
           (attributeValue (rootNameBinding: (0 3 2342 3 1))))))
       (((attributeid networkID)
           (attributeValue (nonRootNameBinding "C-Band Transmit"))))
       (((attributeid equipmentID)
           (attributeValue "C-Tx HPA Controller")))
       (((attributeid equipmentID)
           (attributeValue "C-Tx Main Hpa")))
    ))
    (currentTime 19920209141500)
    (eventType equipmentAlarm)
    (eventInfo (
       (severity critical)
       (backedUpStatus False)
       (equipmentProblemType 10)
       (eventNumber 1673845)
       (problemText "Switch Fail")
    ))
 )))
```

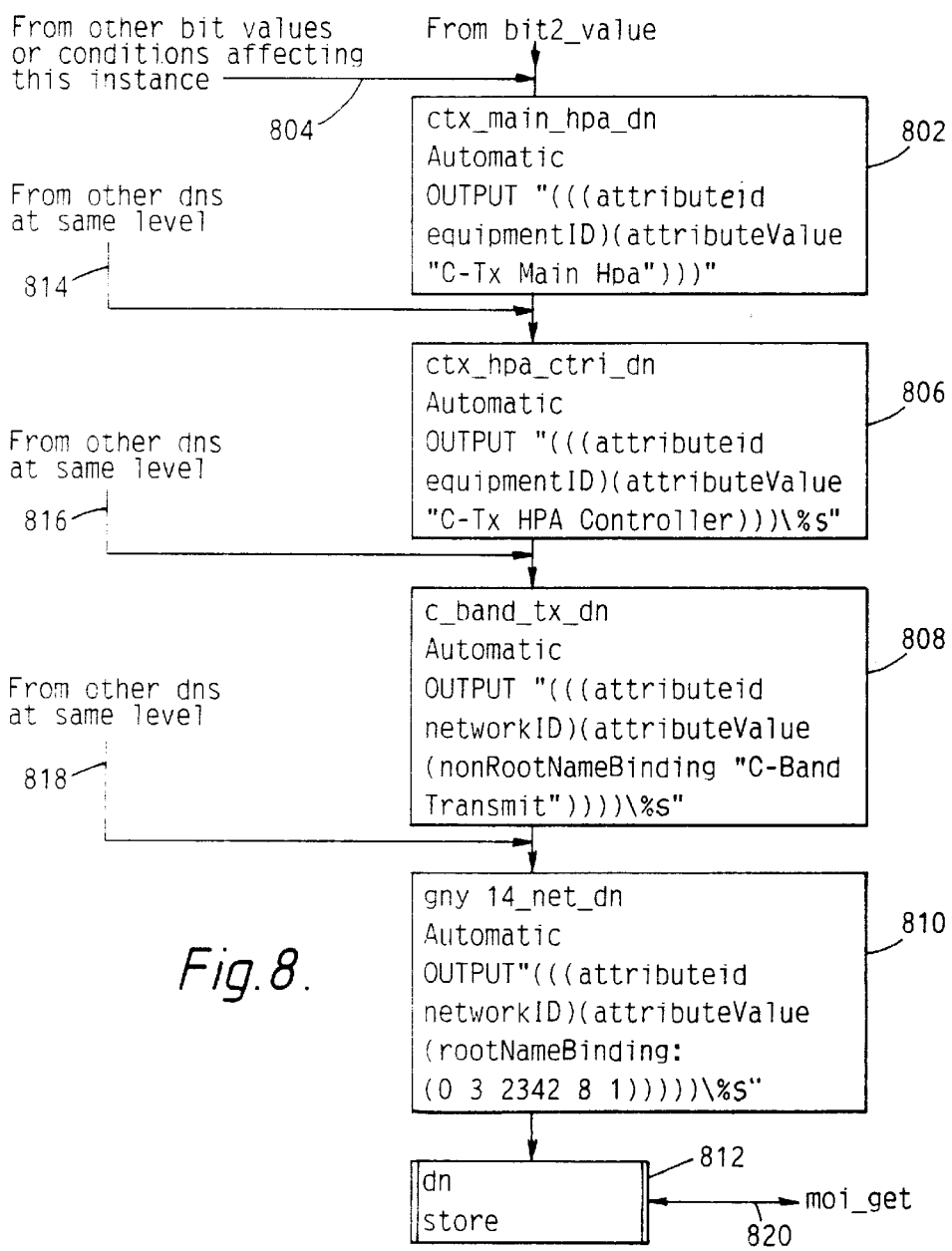

INTERFACE FOR TRANSLATING AN INFORMATION MESSAGE FROM ONE PROTOCOL TO ANOTHER

BACKGROUND OF THE INVENTION

1. Field of the Invention

This invention relates to equipment management systems.

2. Related Art

An equipment management system comprises, in general, one or more pieces of equipment which are monitored and controlled by an equipment manager via an equipment controller.

A particular example of such a system is a network management system in which the equipment comprises interconnected network elements of a telecommunications network controlled by a network element manager. The equipment manager comprises a network manager through which the functioning of the network can be monitored, and instructions can be generated to control the network as required via the network element manager. In general the network will be composed of several different types of network elements, for example modems and multiplexers.

The equipment manager and equipment controller are arranged to communicate using text messages having a plurality of fields according to one protocol whilst the equipment controller and equipment communicate according to a different protocol. In general, for different equipment and equipment controllers, different protocols are used.

If the network manager is not configured to be able to interface with the one, or many, different protocols from the network element managers, it becomes necessary to use several, independent, network managers. There are several disadvantages with such systems arising from the fact that the different network managers do not intercommunicate: it may not be possible, for example, to identify a fault occurring on one part of the network as the cause of problems reported to different network managers. Thus a link may fail which will cause other alarms to be raised to other network managers but it may not be possible to identify the causal connection between these related problems.

In order to avoid such intercommunication difficulties between network managers, it is desirable to adopt an integrated network management approach in which the network management system has a single integrated network manager which produces messages according to a particular protocol but which is able to communicate with all the diverse network element managers.

This integration may be achieved by translation of the "equipment" protocol to a single "management" protocol, either in the equipment controller (for example a network element manager) or in the equipment manager (for example a network manager).

One network management protocol which is being widely adopted is that which conforms to the specifications developed by the Open Systems Interconnection (OSI) Network Management Forum (NMF) which is an international consortium of some 70 member companies worldwide established in July 1988. The object of defining an OSI-NMF standard is to encourage vendors worldwide towards making their proprietary element managers conform to the specification thereby allowing the ready implementation of an integrated network management system.

Such standardisation cannot occur immediately as it needs time for individual equipment manufacturers to modify their existing equipment to the agreed standard, but is a standard to which it is hoped the different vendors will migrate in the course of time. However, even if manufacturers do move to a standard it is expected that not all will use the full functionality that the protocol can provide but will implement some subset of it.

In the absence of all equipment element managers conforming to the OSI-NMF protocol, or some other standard which may be agreed, it is necessary to provide translations from the non-standard protocols adopted by various equipments to an equivalent message in the OSI protocol and vice versa.

A computer implemented interface between the equipment controller and equipment manager is known to be used for translating an original text message in one protocol to a translated text message in the other protocol thereby providing two-way communication between the controller and manager. Such a known interface provides a complete translation process by maintaining its own internal database of translation rules for the non-conformant element managers. It provides the ability to receive management data from a proprietary element manager thus obviating the need for that manufacturer to convert their element manager to OSI-NMF compliance in order to be used in an integrated management system. There are however disadvantages associated with the prior art approaches to providing these translations.

The approach used to date is to take the proprietary message, break it down into its component parts and then do a tree search to see to which of the allowable combinations of components a particular message corresponds. This tree search is then used to access the database to determine the equivalent OSI-NMF conformant message corresponding to the proprietary protocol message. If the number of distinct, proprietary messages is large then the tree search can have very many nodes and require a very large database to be able to supply all the equivalent translations. The technical difficulty of implementing such an interface has led in some cases to system designs providing only partial translations from the proprietary protocol to the OSI-NMF protocol resulting in less than optimum functionality.

Further, the translation to be carried out can be dependent on the state of the system which therefore needs to be taken into account at some stage of the translation process. In prior art systems this requires access to a data base modelling the system.

A further disadvantage is that such interfaces require a great deal of software support. The database has to be modified as the network is changed so that the proprietary messages are translated correctly which requires a great deal of time and effort. This prior art technique also produces a bottleneck as different messages are received requiring successive accesses to the database in order to carry out the translation. Such techniques require large amounts of data storage and repeated accesses to a database which slows down the translation process thereby introducing delays into the time taken for a network to respond to instructions input via a network manager and for a network manager to report, for example, faults and alarms generated by a network when a fault occurs.

BRIEF SUMMARY OF THE INVENTION

The present invention provides an equipment management system comprising one or more equipments controlled by an equipment manager via an equipment controller, the equipment controller and equipment manager being arranged to respond to and produce information messages having a plurality of fields according to a first and a second protocol, respectively, in which the equipment management system includes: a computer implemented interface between the equipment controller and equipment manager for translating an original information message in the first protocol to a translated information message in the second protocol, said interface comprising: a plurality of program modules each responsive to one or more inputs to produce an output which is dependent on whether defined conditions are met by the input or inputs, the outputs of some of the plurality of program modules constituting the inputs of other program modules thereby defining a network of program modules; one or more of the program modules being of the type which is responsive to the original information message having predefined information in a respective field to produce an output which constitutes the input to a further program module, said further program module being responsive to further predefined information in a further field which is valid in the first protocol in the context of said predefined information determined by the preceding module.

The program modules of the network search for allowed information strings in the original message and on detecting them output the original message or a portion of it to further program modules which then search the original message to determine if another field of the input message has valid information in the context of the allowed information determined by the preceding module. In this way the original message is passed either in whole or in part through a series of program modules according to the content of the message. If a series of valid fields has been detected by these series of modules, then a final output can be obtained from the end of the series the success of which indicates that a particular combination of information strings occurs in the original input message.

In this configuration, if a program module fails to find the predetermined information in the original message then no output is produced and the message is no longer passed along that series of interconnected modules. In this case if the text is nonetheless valid it will pass along a different series of modules to eventually produce a different output characteristic of the different nature of the input message.

Once the various fields of the original message have been analyzed in this way by the various networked modules there will be obtained a series of outputs which provide indications of the information content of the original message.

Preferably, these indications of the information content of the original message are used as inputs to further program modules which output information according to the second protocol which is indicative of this information content of the original message. In this way, having determined the information in the original message, the appropriate substrings according to the second protocol can be constructed by consecutive program modules.

It is possible to build up the final message from the outputs indicating the information content of the message by accessing a database, for example, but the above arrangement of using a network of program modules to produce the output strings is favoured.

One advantage of using the interface according to the present invention is that the modules, which provide given information for an output message in the second protocol can be common to several original messages. A given program module can be used in many different circumstances by suitably interconnecting them, thereby simplifying the coding requirement and allowing easier modification in that if one particular aspect needs to be changed then only that program module needs to be modified.

Preferably, said one or more program modules are also of the type which is responsive to the original information message having an absence of the predetermined information in the respective field to produce an output which constitutes the input to a yet further program module responsive to yet further predefined information which is valid in the first protocol in the respective field.

The advantage of this preferred arrangement is that the original message no longer needs to be passed to a number of program modules in parallel, each one looking for respective predefined information, but can be passed to a first module which if it finds the valid information will provide an output to another program module as described above but if it fails to do so it will then branch to a further program module which will look for other valid information in that same field. If that further program module fails to find some other valid information, it can provide an output to a yet further program module responsive to further valid information in that first field. In this way an original message can be input to a single program module and it will eventually find that program module responsive to the particular information, if valid, in a given field and then proceed to pass some or all of the text to sub-modules which look for some predefined information valid in the context of information found in the given field.

Most preferably, the defined condition of at least one program module is modifiable to a new defined condition in dependence on one or more portions of the original message being translated by the interface. The portion of the original message on which the defined condition is dependent may relate to the state of a part of the equipment management system.

For example, consider an original message which relates to a particular amplifier failure. When a program module searches for the particular information in the original message which indicates this condition, then the condition can be stored in a data store associated with the program module and this data can be used to affect the operation of the program module in relation to future original messages, for example, to pass on an output to another program module only in the case that there is a change of state in the power amplifier. Thus, if a later original message again reports the failure of that particular power amplifier, then the program module can be arranged to ignore the message and stop translation. In this way repeat messages can be filtered by the interface as they provide no further information to the equipment manager as it reproduces a previously obtained message.

Because the network of program modules not only translates between protocols but also contains an internal model of the network management system in this preferred arrangement, enhanced functionality is provided which reduces overheads on the equipment managers or the equipment controllers.

This is merely one example of the type of state information that can be stored in the program modules. Others examples will become apparent in relation to the description of the specific embodiment to follow.

BRIEF DESCRIPTION OF THE DRAWINGS

The invention will now be described with reference to the accompanying drawings of which:

FIG. 1 is a schematic drawing of a network management system according to the present invention;

FIG. 2 is a listing of an exemplary original text input message to be translated by the method of the present invention;

FIG. 3 is a listing of the output message to which the input message of FIG. 2 is translated by the equipment management system according to the present invention; and FIGS. 4 to 21 are diagrams showing the program modules used to translate the input message of FIG. 2 to the output message of FIG. 3.

DETAILED DESCRIPTION OF EXEMPLARY EMBODIMENTS

Figure 13:
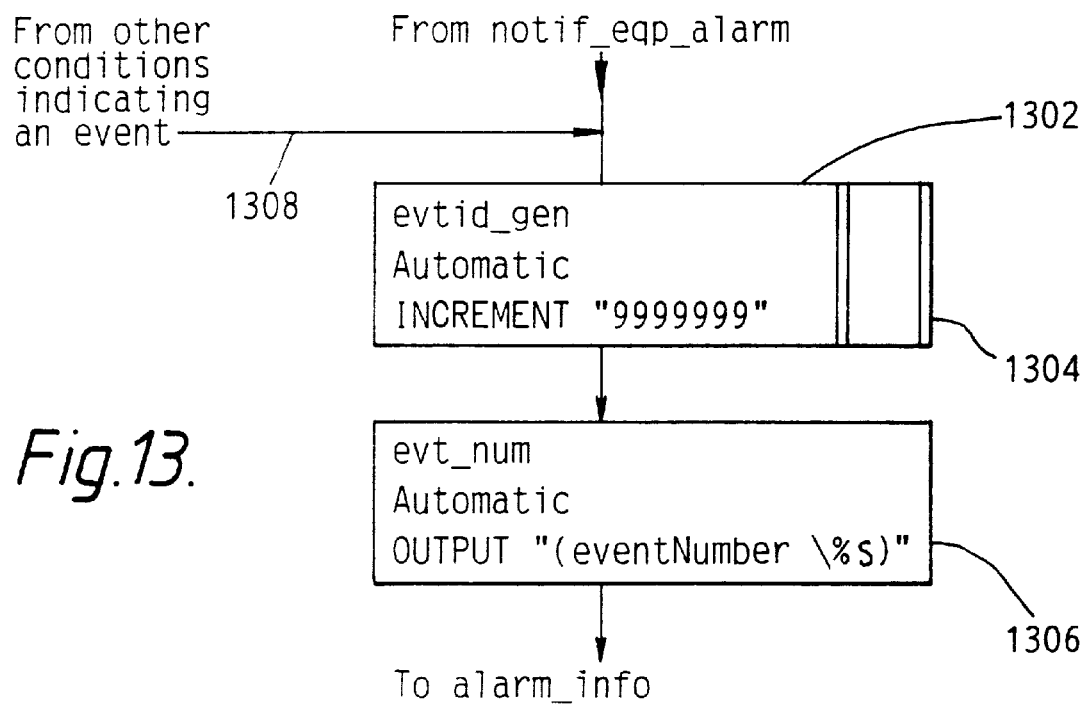

In the drawings, the various components have been given reference numerals whose hundreds value is equal to the Figure number in which they are first mentioned (element 1302 appears in FIG. 13, for example). Strings of characters are indicated by the characters placed between a pair of "s.

Referring to FIG. 1 a network management system comprises a network formed from interconnected network elements collectively referred to by the reference numeral 102. Groups of like network elements, for example 104, are connected a respective input/output module 106.

The signals to or from the modules 106 are combined onto a bus 108 and brought together at an input/output module 110. The combination of the modules 106 and 110 and the bus 108 act as the network element manager providing the non-proprietary message protocol at an interface 112. Events which occur to the equipments 102, 104 are raised by the modules 106 as a logical input to one of the lines of the bus 108. The module 110 reacts to receipt of a particular bit on the bus 108 to output a text message which has a one-to-one correspondence with the bits on the bus 108.

An original input message in non-proprietary format is passed as an input to a computer implemented interface represented by block 114 whose output, onto an interface 116, is a text output in the proprietary message protocol.

Block 114 provides translation of the low-level non-proprietary messages to a simple text format and provides initialisation and reset functions for the blocks 106 and 110.

The text output in the proprietary message protocol is passed to a further computer implemented interface represented by a block 118 which carries out the translation to the OSI conformant form. The block 118 interfaces with the workstation of a network manager 120 whereby a network management operator can monitor the state of the network elements 102, 104 and input control instructions to the block 118.

The block 118 also serves to translate OSI conformant messages from the network management control 120 for output to the interface 116 via the computer program 114 and bus 112.

The modules 106 and 110 and bus 108 are proprietary UNICOM 2000 BITBUS modules and bus, which in this case is supplied by Belcom Technology Limited.

The computer program of block 114 is a C language program running under DOS. The interface 116 is a shared memory interface. The translation software 118 is a C language program running under the UNIX operating system with an OSI communications stack. The programs 114 and 118 run on a dual processor, Intel 386 PC architecture platform.

There will now be described how a particular, exemplary message string 200 of FIG. 2, namely:

"evt: 2: data: 1: 14. 15: Feb. 9, 1992"

is translated into the appropriate message string 300 of FIG. 3, namely

"((m-EventReport-ARGUMENT (
  (managedObjectClass "high PoweredAmplifier")
  (managedObjectInstance (
    (((attributeId networkID)
      (attributeValue (rootNameBinding: (0 3 2342 8 1)))))
    (((attributeId networkID)
      (attributeValue (nonRootNameBinding "C-Band Transmit"))))
    (((attributeId equipmentID)
      (attributeValue "C-Tx HPA Controller")))
    (((attributeId equipmentID)
      (attributeValue "C-Tx Main HPA")))
  ))
  (currentTime 19920209141500)
  (eventType equipmentAlarm)
  (eventInfo (
    (severity critical)
    (backedUpstatus False)
    (equipmentProblemType 10)
    (eventNumber 1673845)
    (problemText "Switch Fail")
  ))
)))"

by the translation software of block 118 in order to illustrate the present invention. The message string 300 is an alarm message.

The alarm message 300 of FIG. 3 comprises five principle fields namely the managed object class 302, the managed object instance 304, the current time 314, the event type 316 and event information 318. The managed object class refers to the specific type of component of the controlled network which has reported an alarm event. The managed object instance is the identifier of occurrences of the particular element of equipment in that class type. The current time is the time at which the alarm was raised, the event type indicates that the event is in fact an equipment alarm and the event information provides the required information needed to handle the particular alarm.

Optional fields that are not required in this particular message 300 are omitted.

In FIGS. 4 to 21 the boxes indicating program modules are annotated with three characteristics. The first line is the name of the program module, the second is the behaviour type and the remaining one or more lines is the action list of the actions to be carried out by the program module.

The behaviour type of a program module is hard coded in that the program module has some fixed behaviour peculiar to its type that it provides in addition to any other actions that may be configured into it. It has been found that seven basic types of behaviour have been able to parse and format all messages required to date, but they could be readily extended if required. The seven basic types are Automatic, Decision, Order, Collator, Store, Read and Delay. All these behaviour types can have optional time-outs associated with them triggered by the first input to be received by the module. On receipt of all the required inputs, or on time-out expiry, the module will then reset to a non-active state and await the next first input.

An Automatic program module carries out its list of actions on receipt of any input.

A Decision program module carries out its list of actions on receipt of at least two inputs one of which is a conditional input.

An Order program module carries out its list of actions on receipt of a defined number of labelled inputs.

A Collator program module carries out its list of actions on receipt of a number of defined inputs. The program module, in addition to carrying out its actions, will construct a list of the inputs it receives.

A Store program module stores the input it receives until it is read big a Read program module.

A Read program module in addition to carrying out any actions also synchronously reads from a Store program module, or the primary data held in association with any other program module.

A Delay program module will delay the processing of its input until it receives a time-out or it will reset itself if it receives a stop input.

All the above program modules can provide an output which may depend on whether the required action list was carried out successfully or not.

In FIGS. 4 to 21 a successful output is indicated by an arrowed line leaving the bottom of a program module box whereas the output associated with a failure to carry out its actions is indicated by an arrowed line leaving a side of the box.

Each program module has associated with it a hard coded list processing method. When the program module is configured it is possible to load the action list with function calls and parameters. When the program module has the right conditions to start, it will process the action list. The results of this processing will lead to a success or fail and the appropriate output.

The functions defining each action are also hard coded and may be any desired functions. It is preferable that they have a maximum of one input parameter, maintain no state and give a single result back. The functions are thus generally very simple to implement and test and yet may give any specialised behaviour that cannot easily be provided by the program modules themselves or their connections.

In general there are three types of function, input and output data stream handling, transaction control, and algorithmic.

The input and output data stream handling functions handle the breakdown or construction of data streams. For example, a specific pattern in the data stream can be ignored, the data stream can be ignored up to a specific pattern, the data stream can be extracted up to a specific pattern, data can be replaced with input data, or the function can generate an output to a specified pattern, or generate an output to a specified pattern with the input string inserted within it. These functions may handle character, byte, or bit streams.

Transaction control functions create and delete transactions and sub-transactions which allow for the control of separate, but related, processing threads. They are used when the program module needs to create several output transactions from a single input transaction or conversely correlate together several input transactions to produce one output transaction.

Algorithmic functions in general carry out simple algorithmic operations such as generating numbers, providing time and date, converting one form of value to another, for example degrees to radians.

The connections between program modules are indicated by arrowed lines. They not only define the flow of messages between the program modules but also the type of connection. There are currently four types used namely success, fail, data and positional.

A success connection is a success output from a program module which is indicated by an arrowed line leaving the bottom of a box. Such a message may be treated by other program modules as a condition or data.

A fail connection is the fail output from a program module which is indicated by an arrowed line leaving the side of a program module. Such a message may be treated by a receiving module either as a condition or data.

The success or fail output is the choice of output selected by a sending module as a result of its own actions. The receiving module is unaware of whether it was a success or a fail.

The outputs of some of the modules are arranged to constitute the inputs of other program modules thereby defining a network of program modules which will carry out the parsing of an original input message and the formatting of a translated output message. The various program modules are in general responsive to one or more inputs to produce an output dependent on whether defined conditions are met by the inputs. For example, to make a decision, carry out a Read operation or concatenate text strings and so on.

A data connection is a success output from a program module where the message is to be treated as data by the receiving program module. This is required so that the receiving program module may distinguish the data from conditional inputs for example for a decision program module).

A receiving module can generally treat an input as either a condition or as data. However, where a cell type (eg a Decision type) needs one or more conditions and data it must be able to distinguish between the two and therefore the sending module must label its output accordingly.

A positional connection is a success output from a program module where the message is to be treated as ordered data by the receiving program module. This is required so that the receiving program module (for example an Order Program Module) may distinguish the order in which the data input should be handled.

The program modules are triggered by inputs to them, as indicated by arrowed lines at their tops, which triggered modules then may produce an output, as indicated by arrowed lines from the sides and bottoms of the boxes. If the module is successful in carrying out its operations then the exit is via the bottom of the box, if it fails then it is from the line at the side of the box.

A box having double vertical lines is a Store program module. A store program module is like any other of the type of program modules described here in most respects. However it has no normal output but supports a synchronous read from a Read program module.

In general every program module will have some information store associated with it in order to determine how to respond to a received input according to whether it accords to predefined conditions. These are not all explicitly shown in the accompanying drawings. However, in some cases the information stored in the data store of a program module is associated with the state of the management system and for clarity of description these have been indicated explicitly in the drawings.

Where there is a numeral associated with any of the box interconnects then this indicates the reference number of the input for a positional connection rather than the value of the input. By this means data passed to a program module with this associated number can be identified as ordered data.

There will now be described those program modules involved in translating the specific input message 200 to the compatible alarm message 300. It should be emphasized at this point that only the program modules for this input message are shown. The network management system will be able to respond to a broad range of input messages and will have associated with it a network of program modules, interconnected to provide the parsing and formatting of the corresponding input message and output message, respectively. In many cases the same function will need to be performed in relation to different input messages. In these cases the program modules described in relation to FIGS. 4 to 21 can be re-used in respect of different input messages. That is, program modules can serve to translate and synthesize many different input and output messages.

The following description does not therefore describe a fully implemented interface but is used to illustrate the principles of the present invention by describing a part arranged to carry out parsing of an original input message and the formatting of a translated output message.

The event report message 300 of FIG. 3 is a string of ASCII characters assembled from sub-component strings by program module evt_rep_arg 402 of FIG. 4. This module accepts information strings on the managed object class, the managed object instance, the current time, the event type and event information on its numbered inputs 0 to 4, respectively.

The second line of text of the evt_rep_arg module 402 (Order) indicates that the inputs on the numbered inputs 0 to 4 are to be concatenated in the order of the inputs. The third line of this module 402 (SETCOMPLETE 5) indicates that an output is generated only when all of the input set has been received. The final line of this module 402, namely:

OUTPUT "((m-EventReport-ARGUMENT (/%s)))"

indicates that the output from this module 402 comprises that string which is the ordered set of inputs from the input lines 0 to 4 prepended with the string "((m-EventReport-ARGUMENT("and appended with the string")))". The string so output is passed to the network manager 120 as indicated by the line 404.

The particular modules involved in parsing the input message 200 of FIG. 2 and the formatting of the five input strings required by the evt_rep_arg module 402 of FIG. 4 will now be described.

Figure 5:
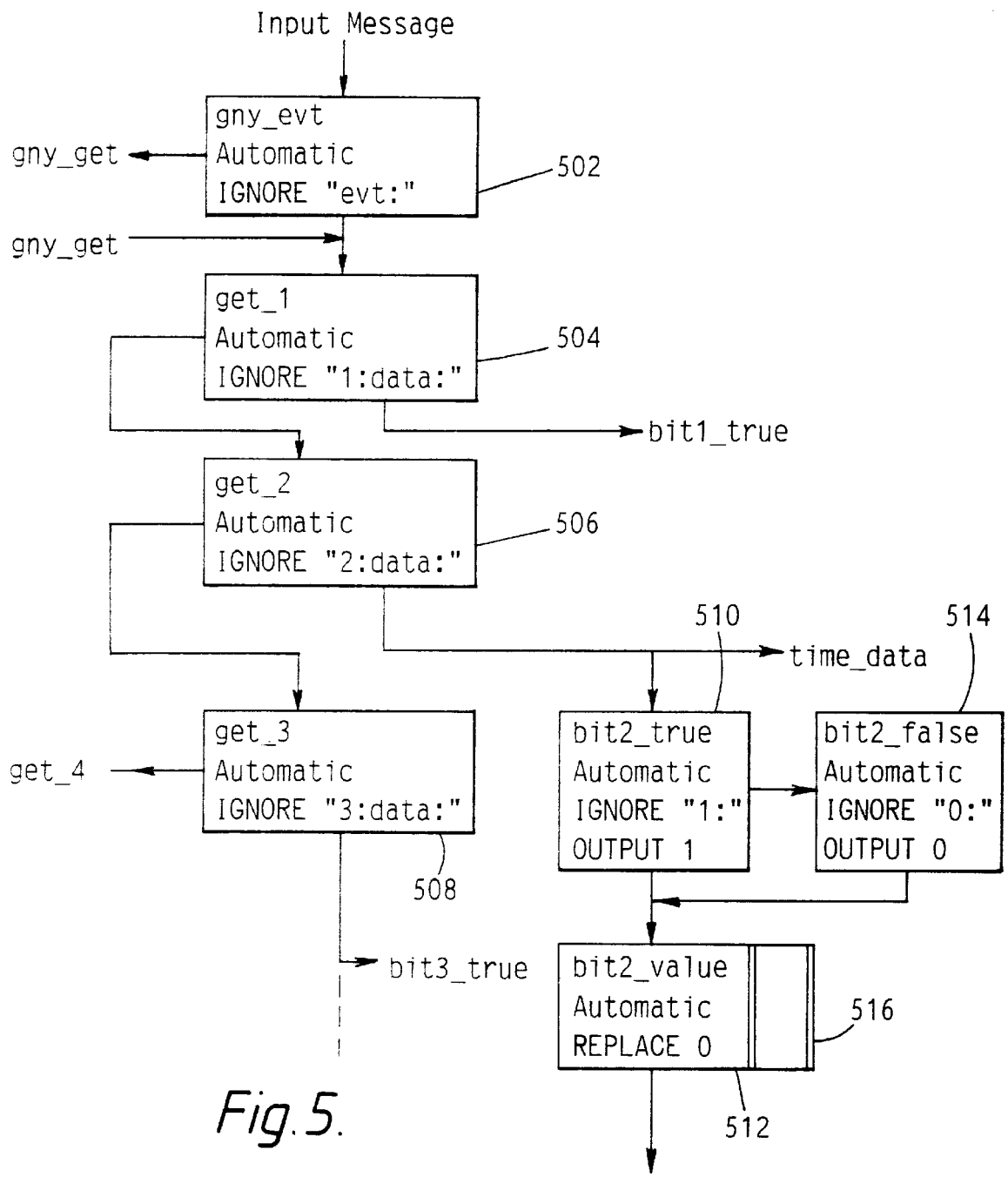

Referring to FIG. 5 the input message 200 of FIG. 2 is input to module gny_evt 502 which is of type automatic and has the action IGNORE "evt:". This tests to see if the input message 200 starts with the string "evt:" which constitutes the defined condition for the module. If it does it moves a message pointer to the next field of the input message 200 and passes the remainder of the input string to module get_504. If it does not find "evt:" at the start of the input message 200 it passes the entire message 200 to a module gny_get (not shown) which will test for the string "get:" at the beginning of the message. If "get:" is found then the message will be handled as appropriate for such a message. If the string "get:" is not present at the start of the input message then further tests can be performed to see if any other allowable message start string is present.

In this specific case, input messages of the form "get: . . . " are handled in the same way as those of the form "evt: . . . ". In the general case they will however be handled differently and according to the specific application.

The exemplary message 200 does start with the string "evt:" and so the input message with the current message pointer located after this initial string is passed to program module get_1 module 504. The module get_1 504 determines if the original text message has text in another field which is valid in the first protocol in the context of the string "evt:" detected by the program 504. This is also of type automatic and has an action IGNORE but in this case the string to be ignored, as indicated by the parameter for IGNORE, is the string "1:data:". If the string passed to get_1 module 504 had started with this string the remainder of the string would have been passed to a module bit1_true (not shown) as indicated by the arrowed line exiting the bottom of the box 504.

In this example, the test carried out by the module get_1 504 fails so the entire message received by get_1 504 is passed to module get_2 506. That is the program module get_1 is responsive to the absence of the string "1: data:" to pass the string to another program module which is responsive to a further predefined text in the same field, namely "2:data:". This acts similarly to program module get_1 504 but, as just indicated, tests to see if the string it receives starts with the string "2:data:". If this test fails then the entire input string is passed on to a module get_3 508 to test to see if the string starts with "3:data:". This process continues through further modules get_4, get_5 and so on (not shown). These test for all the possible legal strings which can be output by module gny_evt 502. In general if the get_n$^{th}$ module is successful then the remainder of the string will be passed to a respective module bitn_true, n an integer.

In the present case the message does contain the string "2:data:" and so the received string with the current message pointer moved beyond the string "2:data:" is passed to a module bit2_true 510.

The remainder of the string following the sub-string "2:data:" is also passed to module time_date 602 of FIG. 6 which will be described in detail later.

Module bit2_true 510 is of type automatic and has two actions. First it tests the start of the string it receives from module get_2 506 to see if it starts with the string "1:". If it does, as in this case, then the action of the module bit2_true 510 is to output a value 1 (representing TRUE) to a module bit2_value 512.

If the string received by the bit2_true module 510 had not started with the string "1:" the message would have been passed to a module bit2_false 514 which is again of type automatic. Module bit2_false 514 has the action of IGNORE "0:" which tests the string to see if it starts with the string "0:". If the string had then the module bit2_false 514 would have output a 0 value to the module bit2_value 512. There is no failure condition for program module bit2_false so should the module bit2_false 514 fail to find the string "0:" at the start of its received message the parsing process would not have been continued any further.

The module bit2_value 512 holds a value (representing FALSE) in a data store 516 which is initialised at the initialisation of the management system to the value 0 as indicated by the parameter of the action REPLACE in the module bit2_value 512. The action of the module bit2_value 512 is to accept an input which is either 1 or 0, to replace the value currently held in the data store 516 with that received value and to output a success output of the received value If the value received was different from that already held. If the value in the data store 516 is the same as that received by the module bit2_value 512 then there is no output of any sort and so the message translation process is halted. The action of the group of program modules 510, 512 and 514 is to convert the values held in the original message into conditions, ie 0 or 1, to hold the current state and to pass on only changes to the current state.

That is, because the program module stores an indication of the state of the network management system it is possible to filter out repeat event messages which would if translated and passed to the network manager simply be ignored but would consume time on the network management system to eliminate it as a repeat.

Further, the defined condition for the program module bit2_value has been modified to a new defined condition dependent on a portion of the original message being translated by the network of program modules, and, in particular, the new defined condition relates to the state of a part of the equipment management system namely the condition of the network element which raised the event message which, as will be described later, in this case is assumed to correspond to the failure of a higher power amplifier.

This change of state may be mapped to any other program module for further processing. By this means parsing is effected, duplicate information is suppressed and the behaviour of the network of program modules becomes dependent on the previous history of messages translated, ie the interface 118 models the state of the network elements from which it receives messages.

Figure 6:
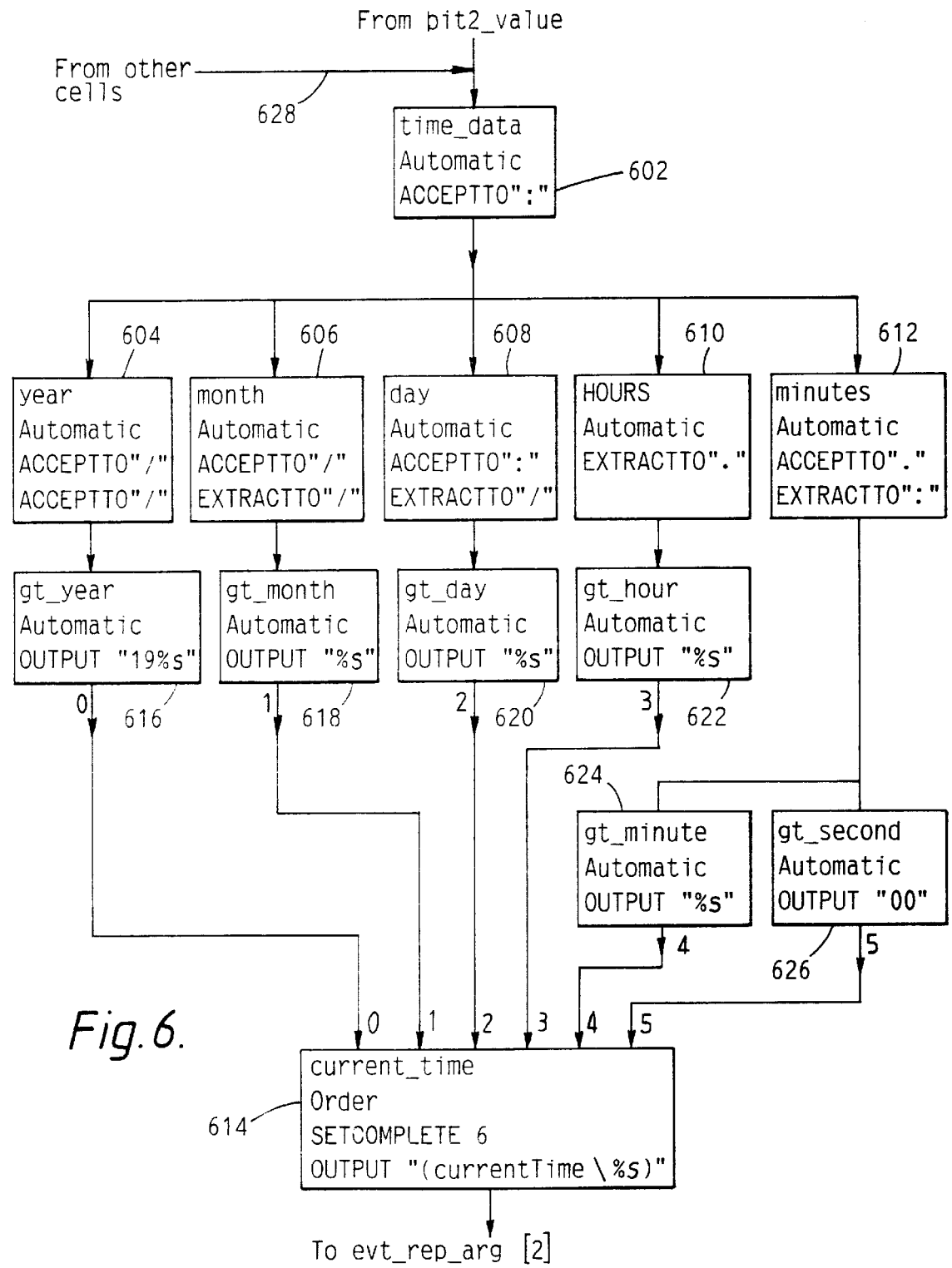

The output from the module get_2 506 is also passed, as stated above, to the module time_date 602 as shown in FIG. 6. The module time_date 602 is of type automatic. The action ACCEPTTO":" indicates that the module accepts that part of the message it receives from bit2_value following the next occurrence of the string ":".

In this case the output from the module time_date 602 is the string "14.15: Feb. 9, 1992". This string is passed on to five modules 604, 606, 608, 610 and 612 which respectively extract that portion of the input string which corresponds to the year, month, day, hour and minute of the input message as will now be described.

The module year 604 of type automatic moves the current message pointer up to and including the first occurrence of the string "/" and then up to and including the next occurrence of "/" as indicated by the two actions ACCEPTTO"/". The resultant string "92" is output from the module year 604.

The module month 606 of type automatic moves the current message pointer of the string from module time_date 602 up to the first occurrence of the string "/" as indicated by the action ACCEPTTO"/" and extracts the string up to the next occurrence of "/" as indicated by EXTRACTTO"/". The resultant string "9" is output from the module month 606.

The module day 608 of type automatic moves the current message pointer of the string received from module time_date 602 up to and including the first occurrence of a "/" as indicated by the action ACCEPTTO":" and then extracts the string portion up to the next occurrence of "/" as indicated by the action EXTRACTTO"/". The output of module day 608 is the string "2".

The module hours 610 of type automatic extracts the string up to the first occurrence of "." from the string passed to it from module time date 602 as indicated by the action EXTRACTTO"." which in this case outputs the string "14".

A module minutes 612 of type automatic moves the current message pointer of the message received from the module time_date 602 up to the first occurrence of ".", as indicated by the action ACCEPTTO"." and then extracts the string up to the occurrence of ":" as indicated by the action EXTRACTTO":". The output of module minutes 612 is, in this case, the string "15".

At this stage, the input message 200 has been decomposed into separate strings indicative of the year, month, day, hour and minute at which the event message originated and there is an output from module bit2_value 512 indicative that the bit 206 of message 200 (bit2) has changed its value from 0 to 1. This information must now be translated into a message intelligible to the network manager.

First there will be described, with reference to FIG. 6, how the time/date strings are used to construct the current time string of CMIS format as indicated by the currentTime field 314 of the output message 300 of FIG. 3.

The field 314 of the final output message 300 is constructed by a module current_time 614 which is of the type order, that is it concatenates string inputs received on numbered inputs in number order. The action "SETCOMPLETE 6" indicates that the module waits for an input from all the six referenced inputs 0 to 5 before producing an output. The action OUTPUT 37 (currentTime /%s)" indicates that the output comprises the string "(currentTime", the concatenation of the six string inputs and finally the string ")".

Numbered input 0 for the module current_time 614 is obtained from a module gt_year 616 of type automatic. Its action is OUTPUT "19% s" indicates that it outputs a string which is a concatenation of the string "19" and the input string it receives from the module year 604. In this case the output of module gt_year 614 is the string "1992" which string is passed to the module current_time 614 as numbered input 0.

Numbered input 1 for the module current_time 614 is derived from a module gt_month 618 which is of type automatic. Its action is OUTPUT" " which means that it simply outputs the string received from the module month 606 unchanged.

Numbered input 2 to the module current_time 614 is obtained from a module gt_day 620 which is of type automatic. Its action is OUTPUT" " which means that it simply outputs the string received from the module day 608.

Numbered input 3 to the module current_time 614 is obtained from a module gt_hour 622 which is of type automatic. Its action is OUTPUT" " which means that it simply outputs the string received from the module hours 610.

Numbered input 4 to the module current_time 614 is obtained from a module gt_minute 624 which is of type automatic. Its action is OUTPUT" " which means that it simply outputs the string received from the module minutes 612.

Numbered input 5 to the module current_time 614 is obtained from a module get_second 626 which is of type automatic. Its action is OUTPUT"00" which means that it is triggered by the receipt of any output from the module minute 612 to output the string "00". This is a default value for the currentTime field 314 of the message 300 as in this case the event message does not contain any indication of the part of the minute at which the event message was generated. The module get_second 626 could have been triggered to produce the output "00" by any message concerned with the extraction of the time/date fields from the message received from the module bit2_value 512 of FIG. 5.

As noted above, once the module current_time 614 has received all six inputs at its numbered inputs 0 to 5 it outputs the appropriate output string to the module evt_red_arg 40 of FIG. 4 for inclusion in the final output message 300 as field 314.

As indicated by the arrowed line 628 on FIG. 6, other original input messages having the same date and time form as in the input message and which require time and date information to be included in the corresponding output message 300 also use the modules of FIG. 6 to produce the required message from those other input messages.

In the particular example of input message 200 under consideration, the actual value of bit2 has been assumed to have changed to value 1 from a previous value of 0. The value 0 is currently held in program module 512 either on initialisation or in response to an earlier event message.

It will also be assumed that bit2 corresponds to an event related to a particular high powered amplifier (HPA), and in particular to the failure of the high amplifier output corresponding to CMIS root name binding (0 3 2342 B 1) of name C-Band Transmit and with equipment identifiers C-Tx HPA Controller and C-Tx Main Hpa.

The bit2 value previously held in program module 512 was 0 indicating that this particular HPA had been working up until the occurrence generating the message 200. It will be assumed that there is associated with this HPA a back up high power amplifier which had previously been reported as having failed. The impact of this on the translation process will be discussed later with reference to FIG. 18.

There will now be described how the value 1 output by the module bit2_value 512 now propagates through a network of modules to produce various components of the output message 300 for application to numbered inputs 0, 1, 3 and 4 of the module evt_rep_arg 40 which concatenates the received text string inputs to form the output message 300 in the second protocol. As described above the other input (number 2) for evt_rep_arg 40 has been provided by the module current_time 614 of FIG. 6.

Reference will now be made to FIG. 7. It is known to which managed object class bit2 corresponds so the value output by the module bit2_value 512 is passed to the appropriate module which outputs a text string describing that class of equipment. In this case the output from the module bit2_value 512 is passed to a module oc_hpa 702 which is of type automatic and whose action is to output the string "highPoweredAmplifier" on receipt of any value from the bit2_value module 512. The string output by the module oc_hpa 702 is passed to a string data store moc 704 which has the action of storing any string which it receives. As indicated by line 706 of FIG. 7, if another bit other than the bit 2 is also concerned with a high powered amplifier then the corresponding bit value output would also be input to the oc_hpa 702 in order to obtain the required output string for managed object class store 710.

Also, as indicated by the line 708 of FIG. 7, the data store moc 704 is also used to store the string identifying the managed object class affected by a current input message when it corresponds to classes other than a high powered amplifier.

The contents of the data store moc 704 can be accessed for further processing by a module moc_get (which will be described later with reference to FIG. 10) as indicated by arrowed line 710.

It is also known to which particular instance of the class of high powered amplifiers bit2 corresponds. The full distinguishing name for the particular instance comprises four levels of identification (id), namely two levels of equipment id, and two levels of network id. The full name is built up as follows.

Referring now to FIG. 8, the output value from the module bit2_value 512 is input to a module ctx_main_hpa_dn 802 which on receipt of any value outputs the string "(((attributeId equipmentID)(attributeValue "C-Tx Main Hpa")))" which forms the first component of the name of the affected instance. Any bit value which is related to this instance may input to ctx_main_hpa_dn to obtain this output string as indicated by the arrowed line 804.

The output from the module ctx_main_hpa_dn 804 is passed to a module ctx_hpa_ctrl_dn 806 which prepends the next level of the name, that is "(((attributeId equipmentID) (attributeValue "C-Tx HPA Controller")))" thereby continuing the process of building up the full distinguished name of the instance. It should be noted that this acts as a parent to any instance contained within it and is shared by its children in the containment tree. The output from the module ctx_hpa_ctrl_dn 806 is passed to a module c_band_tx_dn 808 which prepends the string "(((attributesId networkID)(attributeValue (rootNameBinding "C-Band Transmit"))))" building the next level of containment which string is output to a module gny14_net_dn 810.

The module gny14_net_dn 810 outputs the string it receives pretended by the string "(((attributesId networkID)(attributeValue (nonRootNameBinding(0 3 2342 8 1))))" to form the top Level of the containment and the whole string is output to a string data store dn 820.

As indicated by lines 814, 816 and 818, other bit values corresponding to the various levels of the designation of an instance can be input at the appropriate stage to prepend the required designators. As indicated by arrowed line 812, the contents of the store dn 812 can be retrieved by a module moi_get 1002, which will be described later with reference to FIG. 10.

With the particular event message 200 under consideration in which the value of bit2 is reported as having changed it is known that this corresponds to an equipment alarm whether it be a piece of equipment going down or a piece of equipment being restored to proper functioning. In the event that the piece of equipment is coming back on stream the output message will be identical to that shown in FIG. 3 except that the severity field 318a will be severity clear. This allows the event message to be correlated with previous event messages for that equipment. In this case all the fields are generated as in this exemplary message 200 except for the severity field. That is, the defined condition on which the program module responds to an input is dependent on the data stored in the data store which is indicative of the state of the network input to management system.

Figure 9:
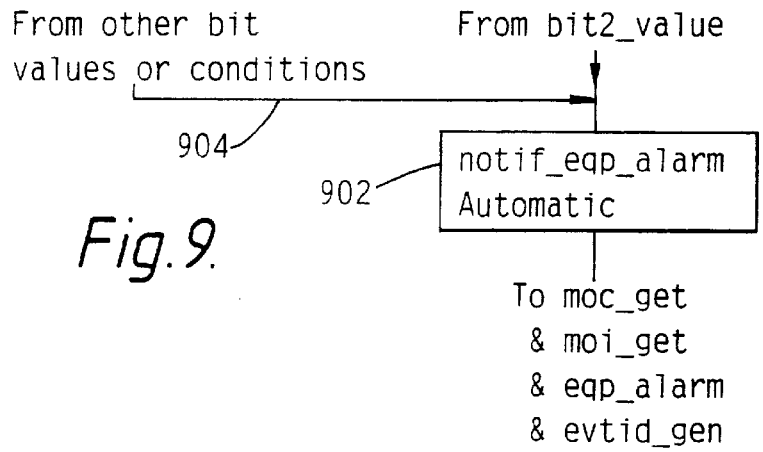

Accordingly, the output from module bit2_value 512 is also input to a module notif_eqp_alarm 902 as shown in FIG. 9 which is of type automatic and whose action is to fan out the value it receives from module bit2_value 512 to activate all the modules that are common to any equipment alarm. These are modules which will get the managed class, get the managed object instance, set up the event type as an equipment alarm, and generate an event number. These actions are carried out by modules moc_get 1002, moi_get 1102, eqp_alarm 1202 and evtid_gen 1304, respectively, which will now be described with reference to FIGS. 10, 11, 12 and 13, respectively.

Referring still to FIG. 9, the module notif_eqp_alarm 902 is also triggered to fan out bit values or other conditions which also indicate that an equipment alarm needs to be generated, as indicated by the line 904.

Figure 10:
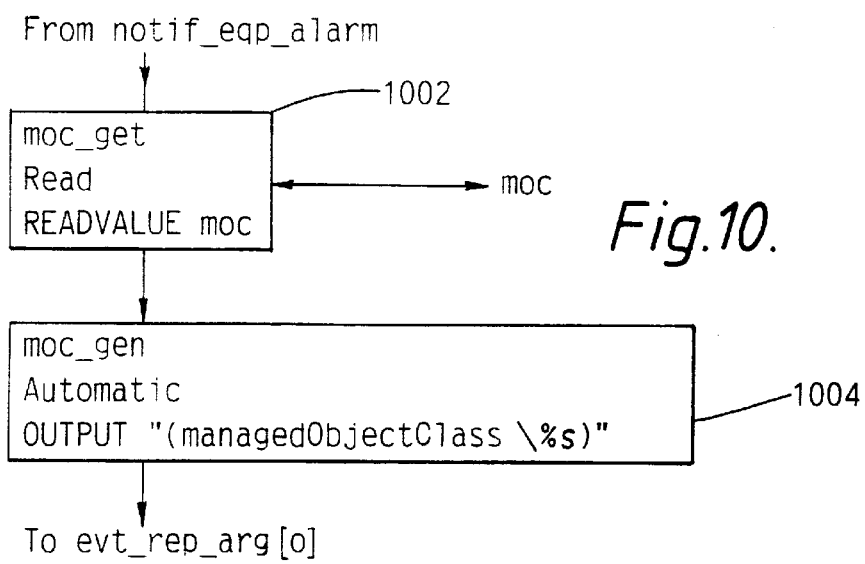

Referring now to FIG. 10 there is shown the module moc_get 1002 of type read which on receiving an output from module notif_eqp_alarm 902 reads the contents of the data store moc 710 as indicated by action READVALUE moc. The action of READVALUE is to wait for a data value to be stored in the named data store if it is not there already and then read that value.

The managed object class read by module moc_get 1002 is output to a module moc_gen 1004 which is of type automatic and whose action is to output the string passed to it from the module moc_get 1002 after prepending the string "(managedObjectClass" and appending the string")". The output from the module moc_gen 1004 provides the string which comprises field 302 of the output message 300 which string is passed to the 0 input of module evt_rep_arg 402 which was described earlier with reference to FIG. 4.

Figure 11:
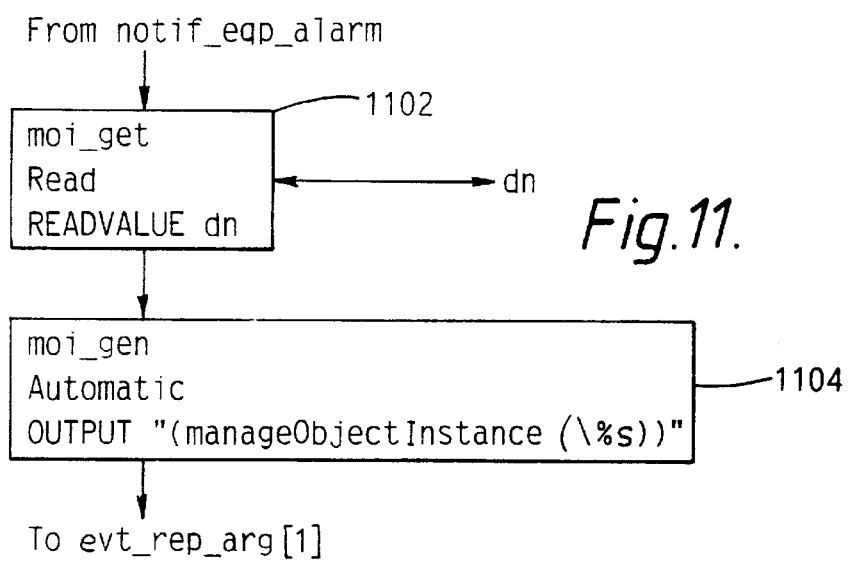

Referring now to FIG. 11 there is shown the module moi_get 1102 which has the same type and action as module moc_get 1002 just described but in this case the data value read is that string stored in the data store dn 812. Once module moi_get has read a value from data store dn 812 it passes that string to a module moi_gen 1104, which is of type automatic and has the action of outputting the string received from the module moi_get 1102 after prepending the string "(managedObjectInstance ("and appending the string"))". The string output from the module moi_gen 1104 comprises field 304 of the output message 300 and is passed as input number 1 to the module evt_rep_arg 402.

Figure 12:
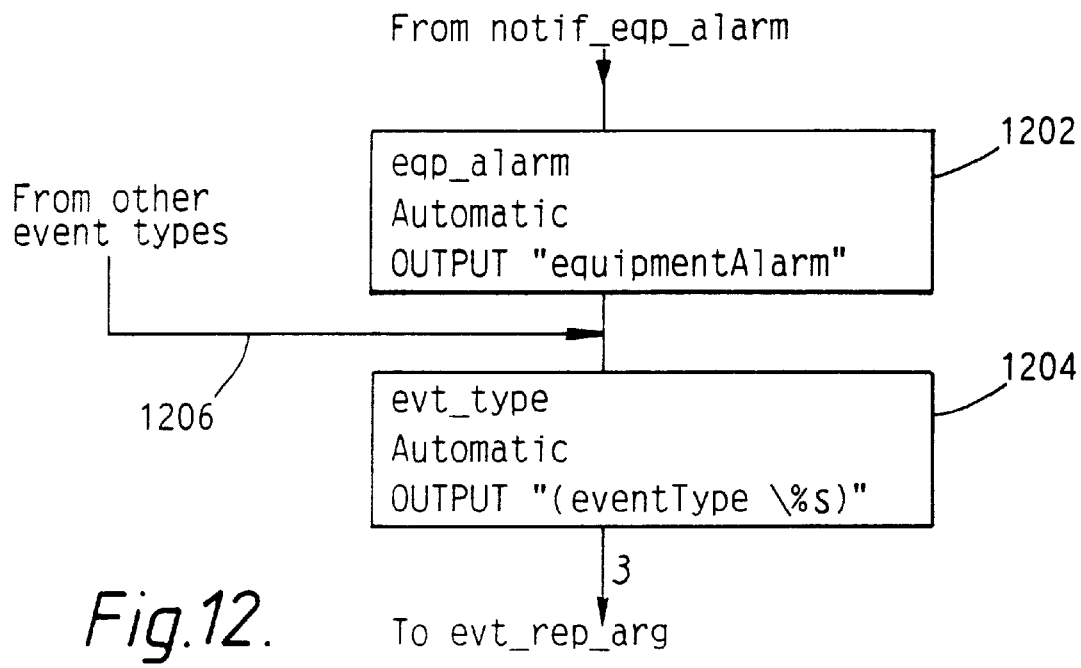

Referring now to FIG. 12 the module eqp_alarm 1202 is shown. This is of type automatic and has the action on receiving an input string from the module notif_eqp_alarm 902 to output the string "equipmentAlarm". This string is input to a module evt_type which is of type automatic and which has the action of prepending the string with the string "(eventType" and appending the string )" which comprises field 316 of the output message 300. This string is input as the number 3 input to the module evt_rep_arg 402 as previously described with reference to FIG. 4.

The module evt_type 1204 acts to form the necessary string describing other event types from other strings input to the module evt_type 1204 as indicated by line 1206. Such a string might be, for example, "attributeChange".

Referring now to FIG. 13 the output from the module notif_eqp_alarm 902 is, as previously described with reference to FIG. 9, passed to the module evtid_gen 1302 which is of the type automatic. It has the action "INCREMENT" which operates to increment an event number held in a data store 1304 associated with the program module 1302 and to output the new value to a module evt_num 1306. This module is of type automatic and outputs the string received from the module evtid_gen 1302 having prepended the string "(eventNumber" and appended the string")".

The parameter "9999999" of the action of the module evtid_gen 1302 indicates the initial value to be held. The first event will roll the counter to 0.

The module evtid_gen 1302 is triggered by any condition for which an indication that an event has occurred is needed, as indicated by the line 1308.

Figure 14:
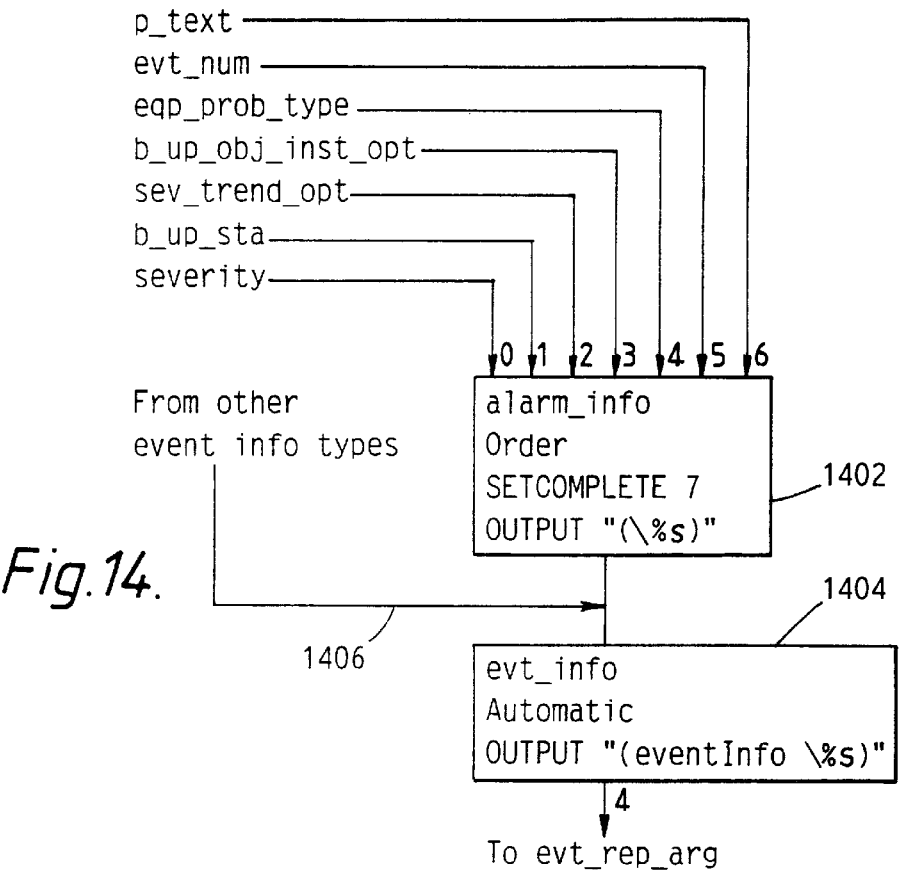

Referring to FIG. 14 a module alarm_info 1402 has seven ordered inputs on lines 0 to 6 and is of type "Order". Its action is to concatenate the strings received on the seven numbered inputs in number order.

The first action of module alarm_info 1402 is to wait until there is a complete set of seven input strings, as indicated by the action "SETCOMPLETE 7". These concatenated strings are then output with a prepended string "(("and an appended string ")".

This output string is passed to a module evt_info 1404 which is of type automatic and whose action is to output the string received from the module alarm_info 1402 having prepended the string "(eventInfo"and appended the string ")".

This string constitutes field 308 of the output message 300 and is passed to input 4 of the module evt_rep_arg 402 as previously described with reference to FIG. 4.

The module evt_info 1404 is also used to construct the eventInfo field 318 which contains other information types as indicated by the line 1406 on FIG. 14.

There will now be described the formation of the seven inputs to the module alarm_info 1402 which inputs comprise the strings corresponding to the sub-fields 308a to 308e of the message 300 of FIG. 3.

The input number 5 to the module alarm_info 1402 in this particular instance of input message 200 comprises the output from the module evt_num 1306 previously described with reference to FIG. 13. If the input message was one that required fields concatenated by module alarm_info 1402, but it was not appropriate to include an event number, a null input would be sent as input 5 from a module evtid_null (not shown). This illustrates how optional fields in the final message are handled.

The remaining six inputs to the module alarm_info 1402 fall into two broad categories. The inputs to inputs numbered 0, 1 and 3 form one set: all are dependent on the status of the backup high power amplifier of the amplifier which as stated earlier is assumed to have failed. Inputs numbered 2, 4 and 6 form a second set: they all can, in this instance, be generated directly from the knowledge as to which piece of equipment has changed status.

Because it is known to which piece of equipment bit2 corresponds it is possible in this case to use the output from the module bit2_value 512 to trigger modules which will provide the sub-fields corresponding to the severity trend, the equipment problem type 318c and problem text 318e of the output message 300. In this particular case the severity trend is an optional field and does not appear as an explicit field in the output message 300. The equipment type problem and problem text do form sub-fields 318b and 318e of the output message 300.

Figure 15:
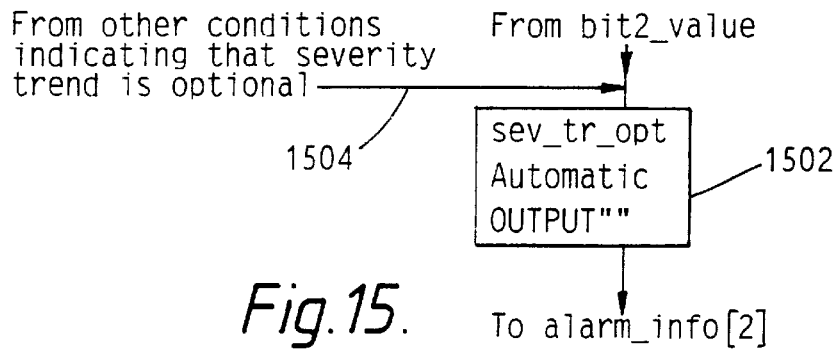

Referring first to FIG. 15 a module sev_tr_opt 1502 of type automatic outputs a null string " " on receipt of an input from the module bit2_value 512. This null string is then passed to the input number 2 of the module alarm_info 1402. As indicated by the line 1504, other conditions that indicate the severity trend is optional are also input to the sev_tr_opt module 1502.

If the event had required that a severity trend field be present, the appropriate string for the severity trend field of the event information field 308 would instead be obtained from a sev_trend module (not shown) and input into the second input of the module alarm_info 1402.

Figure 16:
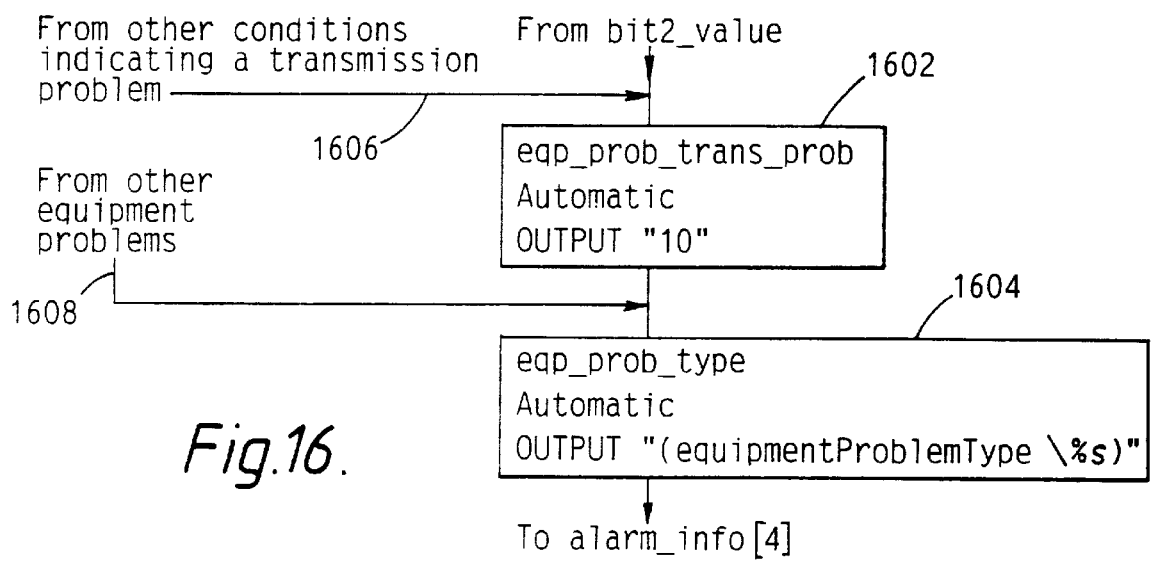

Referring now to FIG. 16 it is known that bit2_value has changed and that this corresponds to an equipment problem type 10. Accordingly, the output from the module bit2_value 512 is input to a module eqp_prob_trans_prob 1602 which is of type automatic and whose action is to output the string "10" and pass it on to a module eqp_prob_type 1604. This module is of type automatic and acts to prepend to the string "10" obtained from the module eqp_prob_trans_prob 1602 with the string "(equipmentProblemType" and to append the string")".

The module eqp_prob_trans_prob 1602 is also triggered by other events which indicate a transmission related event as these will also require a string "10" to be generated and have this processed by module eqp_prob_type 1604. This is indicated by the line 1606 in FIG. 16.

As indicated by line 1608, if any equipment problem other than a transmission problem has occurred the output from another module (not shown) is input to the module eqp_prob_type 1604 to provided the appropriate string to be incorporated into the equipment problem type field by module eqp_prob_type 1604.

If the event had required a problem type which is not an equipment problem then the output from other modules (not shown) are passed to the fourth input of the module alarm_info for incorporation into the event information field 308 of the output message 300.

Figure 17:
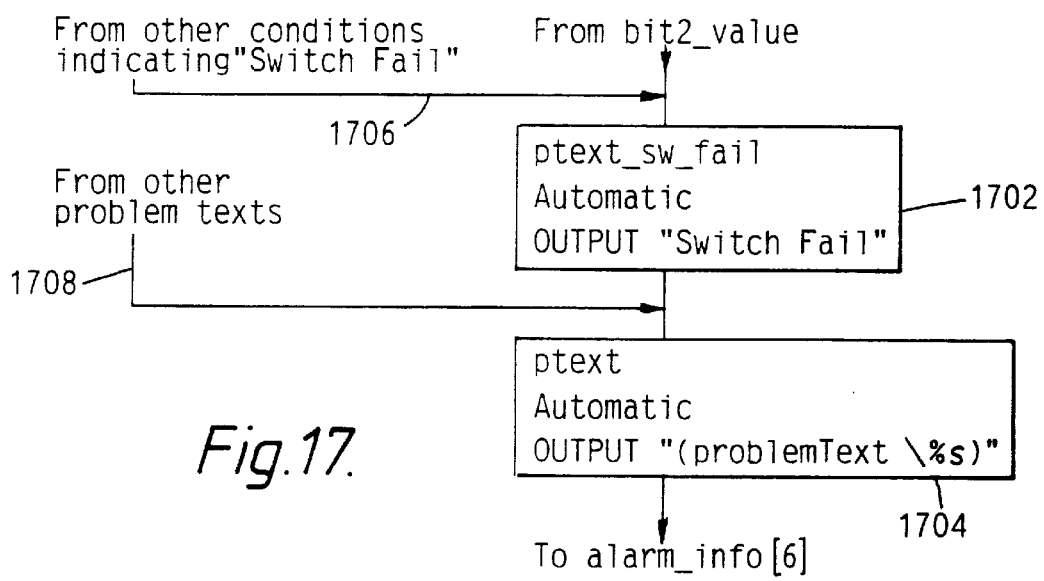

Referring now to FIG. 17, it is known that bit2 relates to a switch failure (whether it has failed or a previous failure has been cleared) so the output from the module bit2_value 512 is also input to a module ptext_sw_fail 1702 which is of type automatic. It has the action of outputting the string "Switch Fail" which output is passed to a module ptext 1704 which is of type automatic and whose action is to take the string output by the module ptext_sw_fail 1702 and prepend the string "(problemText" and append the string". The resultant string is output to the sixth input of the module alarm_info 1402.

As indicated by the line 1706 the module ptext_sw_fail 1702 is also triggered to output the string "Switch Fail" from other conditions that indicate that a switch has failed.

As indicated by the line 1708 in the case of a non-switch failure for which another problem text is appropriate that other text is input to the module ptext 1704 in order to provide the appropriate string for the sixth input of the module alarm_info 1402.

If it is not appropriate to the particular input message received to have a problem text field then a null string from a module ptext_opt (not shown) can instead be input to the sixth input of the module alarm_info 1402 which will result in the absence of a problem text field 318*e*.

As noted earlier, the three remaining inputs to the module alarm_info 1402, namely inputs 0, 1 and 3, are dependent on the status of a backup high powered amplifier. It will now be described how the status of the high powered amplifier affects the various fields generated for input to the module alarm_info 1402.

Figure 18:
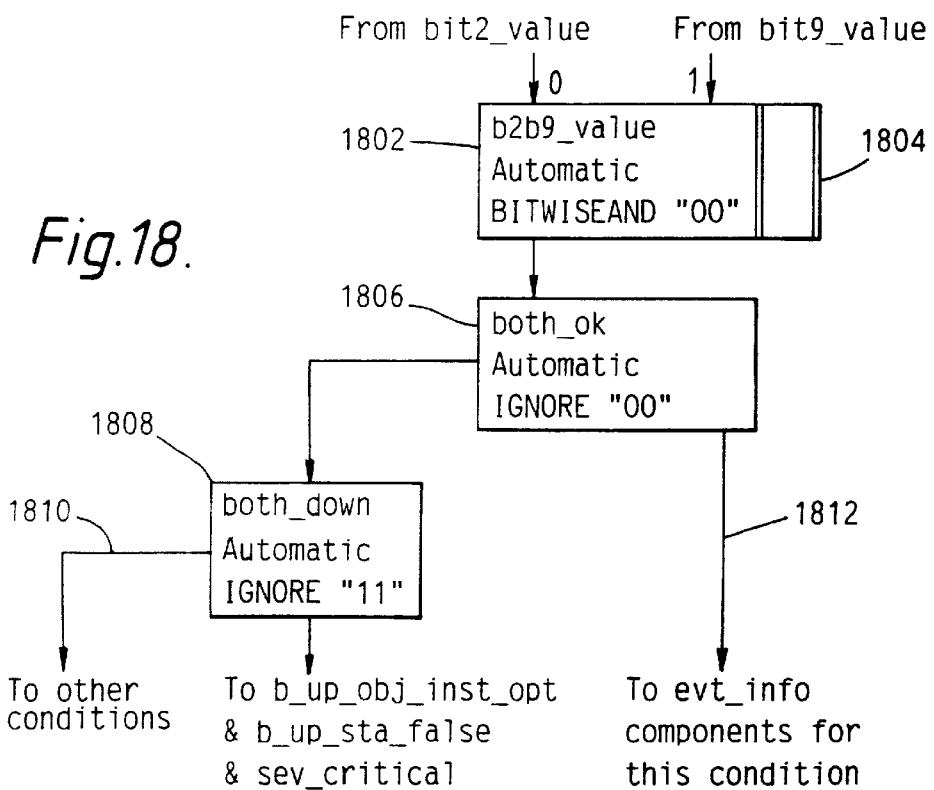

Referring now to FIG. 18 it is assumed that changes to the backup amplifier are reported via bit9 of input messages. If the last reported status of the backup amplifier was 0 then the backup amplifier is operational: if the last bit9 data was a 1 then that corresponds to a failed backup amplifier. These status values are obtainable by modules get_9, bit9_true, bit9_false and bit9_value (none of which are shown) which operate relative to bit9 data precisely as modules get_2 508, bit2_true 510, bit2_false 514 and bit2_value 512 operate relative to bit 2 data as described with reference to FIG. 5.

The outputs from modules bit2_value 512 and bit9_value (not shown) are input to numbered inputs 0 and 1 respectively of a module b2b9_value 1802. It is of type automatic and has the action of taking a numbered input and replacing the character in the current value at that numbered position stored in a data store 1804 associated with the program module 1802 with a new input value. For example, if the current value is 11 and 0 is received on input 0 then the current value would change to 01. If the current value has changed that new value is output. If there is no change to the current value of the data stored in the data store 1804 then the module b2b9_value 1802 does not produce any output.

The action operator "BITWISEAND"00" " indicates that the initialisation value to be stored in the data store 1804 is "00" and is of size two-characters.

In the particular instance under consideration it is assumed that the backup power amplifier has already been reported as failed via a previous input message and that the value stored in the program module 1802 is 01 when the input message 200 is received. On receipt of the value 1 from module bit2_value 512 indicating that the high power amplifier has failed at numbered input 0 of module b2b9_value 1802, the value stored is changed to "11" and this value is output and passed to a program module both_ok 1806.

The module both_ok 1806 is of type automatic and indicates a successful action if it receives the string "00" and indicates failure by outputting the received string if any other string is received. The indication of failure in this case is conveyed to a module both_down 1808 which also is a type automatic and has the action of ignoring the string 11. If it does so then a successful outcome is generated, if not a failure is generated by outputting the required string, as by indicated line 1810, to other modules (not shown) to determine which other condition exists namely 10 or 01.

In this particular example it is assumed that the input to the module both_down 1808 is in fact the string "11" so a successful indication is passed to those modules appropriate for generating the sub-fields for field 308 appropriate to the situation where a high powered amplifier fails and the backup has previously failed. These modules will be described in more detail later.

As indicated by line 1812 if module both_ok 1806 had received the string "00" then it is ignored and those modules (not shown) appropriate for the situation where the power amplifier and the backup amplifier are both operational are triggered.

Figure 20:
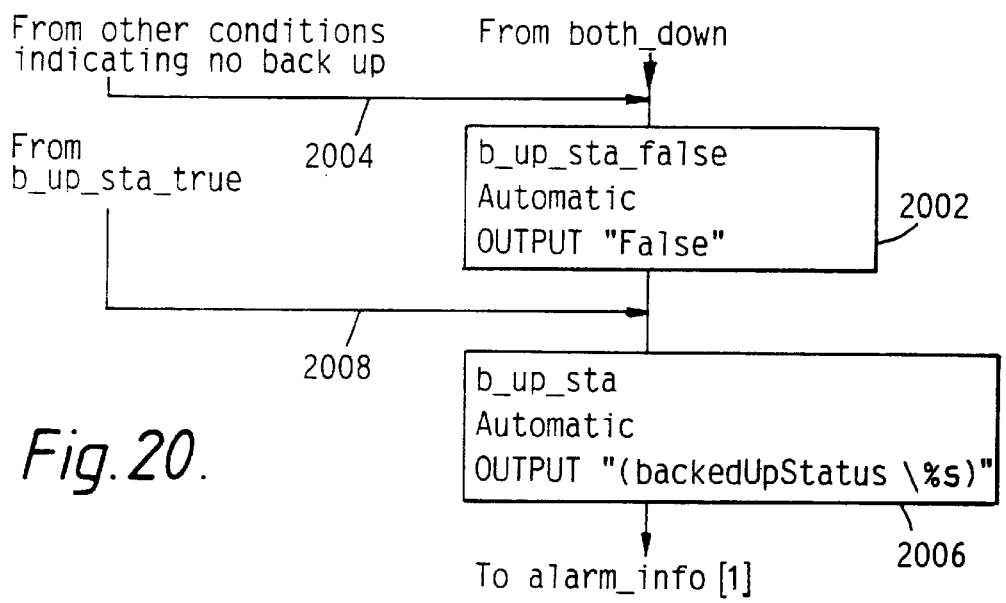
Figure 21:
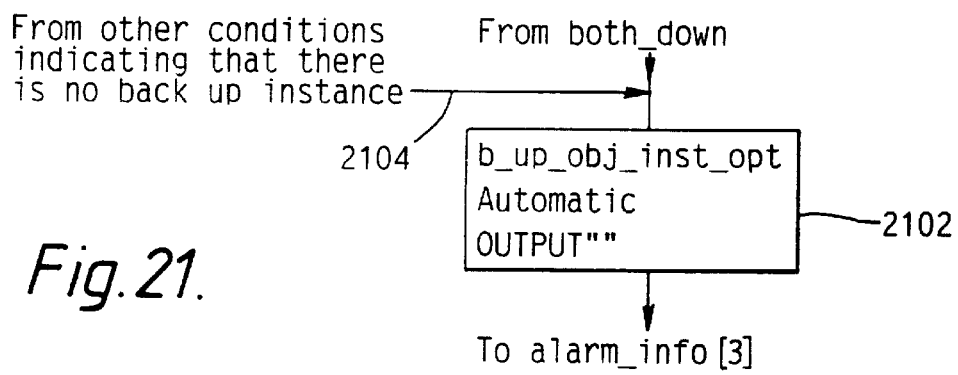

The success output from the module both_down 1808 is passed to three further modules namely module sev_critical 1902 (shown in FIG. 19), b_up_sta_false 2002 (shown in FIG. 20) and b_up_obj_inst_opt 2102 (shown in FIG. 21).

Figure 19:
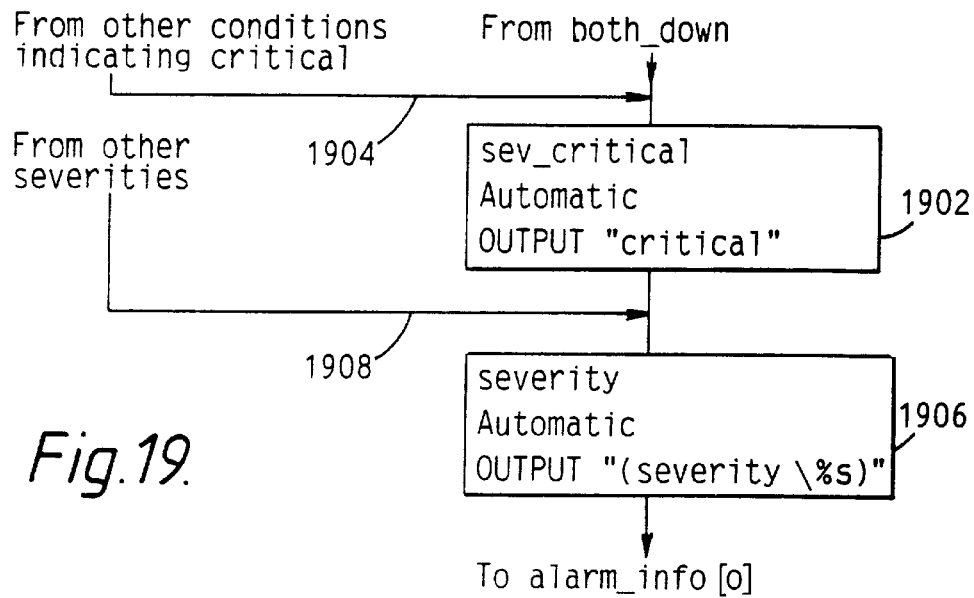

Referring first to FIG. 19, the module sev_critical 1902 receives the successful output from the module both_ok 1806 and, as indicated by a line 1904, from other modules (not shown) triggered by conditions indicating that a critical severity has been triggered. The module sev_critical 1902 is of type automatic and has the action of outputting the string "critical" to a module severity 1906.

The module severity 1906 is of type automatic whose action is to output the string "critical" received from the module sev_critical 1902 having prepended the string "(severity" and appended the string")". The resultant output string is passed to the 0 input of the module alarm_info 1402 of FIG. 14. This output from the module severity 1906 constitutes the field 318*a* of the output message 300 of FIG. 3.

As indicated by the line 1908, other classes of severity can be incorporated in the field 318*a* of FIG. 3 by inputting strings from other modules (not shown) appropriate to other input messages.

An example would be if following this particular input message 200 currently under consideration a further input message was received indicating via bit2 that the amplifier was now functioning. In this case a string "clear" would be generated by a module (not shown) which string would be input to the module severity 1906 in order to produce a field 308 containing the string "severity clear".

Referring now to FIG. 20, the success output from the module both_down 1808 is input to the module b_up_sta_false 2002 which is of action type automatic and has the action of outputting the string "False". As indicated by the line 2004 this module is also triggered by other conditions requiring an indication that there is no backup.

The string "False" output by the module b_up_sta_false 2002 is input to a module b_up_sta which is of type automatic and has the action of taking the string "False" and outputting it prepended by the string "(backedUpStatus" and appended by the string ")", which output is input to the number 1 input of the module alarm_info 1402 of FIG. 14. This string output by the module b_up_sta constitutes field 308*b* of the output message 300 of FIG. 3.

As indicated by the line 2008, in other circumstances when the backed up status is true, an input from a module b_up_sta_true (not shown) whose output comprises the string "True" is passed to the module b_up_sta 2006 to produce the field "(backedUpstatus True)".

If an input message does not need a backed up status field 318*b* then a null string from a module b_up_sta_opt (not shown) will be input to the number 1 input of the module alarm_info 1402 which results in the field not being present in the final translated message 300.

Referring now to FIG. 21, the output from the module both_down 1808 is also input to module b_up_obj_inst_opt 2102 which is of type automatic and has the action of outputting the null string " " to the third input of the module alarm_info 1402. This is because in the absence of an operating backup equipment there is no need for a backup instance field and so a null string is output.

In other equipment where there is a backup present, for example if the backup high powered amplifier corresponding to bit9 was to become operational, then a string indicating which amplifier was the backup would be generated by a module b_up_obj_inst_gen (not shown) and input to the third input of the module alarm_info 1402. As indicated by line 2104, other conditions indicating that there is no backup instance will also trigger module b_up_obj_inst_opt 2102.

It will be appreciated that the present invention allows for arbitrary conversions between incoming and outgoing messages according to different protocols not only on the basis of the messages themselves but also on the history of previous messages handled by the interface. This avoids the need to explicitly hold the context of a message in a central reference which would be different for every message received, either because of the difference in message or the difference in history.

The use of program modules to determine the presence or absence of elements of an input message allows the use of the modules for different messages so avoiding the need to use a fully expanded tree to represent every possible case.

It has been found that such a network of program modules can be readily updated to take into account changes in the protocols being used and also to reflect changes in the network management system with which the interface is being used.

What is claimed is:

1. An equipment management system having at least one piece of equipment controlled by an equipment manager via an equipment controller, said equipment controller and equipment manager being arranged to respond to and produce information messages having a plurality of fields according to a first and a second protocol, respectively, in which said equipment management system includes a computer implemented interface between said equipment controller and said equipment manager for translating an original information message in said first protocol to a translated information message in said second protocol, said interface comprising:

a plurality of program modules, each of which has at least one input and at least one output, each program module being arranged to perform a predefined action on data received at its said at least one input, outputs of some of said program modules constituting inputs of others of said program modules thereby defining a network of program modules;

said program modules including a plurality of modules of a first type, each of which is responsive to said original information message having respective predefined information in a first field and a plurality of program modules of a second type, each of which is responsive to said original information message having respective predefined information in a second field;

one of said modules of said first type being arranged to receive an original information message and, in the absence of detecting its respectively associated predefined information in said first field of an original message, to output such original message to an input of another one of said modules of the first type;

each module of said first type being arranged, on detecting its respectively associated information in said first field, to output a message which includes at least a portion of such original information message to an input of one of said modules of the second type;

at least one of said modules of said second type being arranged, in the absence of detecting its respectively associated predefined information in said second field, to output the message which it receives at its input to an input of another one of said modules of said second type;

each module of said second type being arranged, on detecting its respectively associated predefined information in said second field, to produce at an output a message which includes an indication that such information has been detected successfully; and said program modules including at least one program module which, on receiving a message at an input produces at an output a message which includes an information stream according to said second protocol.

2. An equipment management system as in claim 1, in which, for one of said program modules, said predefined action is modifiable in accordance with a state of a part of said equipment management system as indicated by information contained in said original information message.

3. An equipment management system as in claim 2, in which information regarding said state of the part of the equipment management system is stored in a data store associated with the respectively associated program module.

4. An equipment management system as in claim 1, wherein at least one of said program modules concatenates a number of received information string inputs to form an output message in the second protocol.

5. An equipment management system as in claim 1, in which said at least one piece of equipment being controlled includes network elements.

6. A computer implemented interface for translating an original information message in a first protocol to a translated information message in a second protocol, said interface comprising:

a plurality of program modules, each of which has at least one input and at least one output, each program module being arranged to perform a predefined action on data received at its said at least one input, outputs of some of said program modules constituting inputs of others of said program modules thereby defining a network of program modules;

said program modules including a plurality of modules of a first type, each of which is responsive to said original information message having respective predefined information in a first field and a plurality of program modules of a second type, each of which is responsive to said original information message having respective predefined information in a second field;

one of said modules of said first type being arranged to receive an original information message and, in the absence of detecting its respectively associated predefined information in said first field of an original message, to output such original message to an input of another one of said modules of the first type;

each module of said first type being arranged, on detecting its respectively associated information in said first field, to output a message which includes at least a portion of such original information message to an input of one of said modules of the second type;

at least one of said modules of said second type being arranged, in the absence of detecting its respectively associated predefined information in said second field, to output the message which it receives at its input to an input of another one of said modules of said second type;

each module of said second type being arranged, on detecting its respectively associated predefined information in said second field, to produce at an output a message which includes an indication that such information has been detected successfully; and said program modules including at least one program module which, on receiving a message at an input produces at an output a message which includes an information stream according to said second protocol.

7. A computer implemented interface as in claim 6, wherein at least one of said program modules concatenates a number of received information strings inputs to form an output message in the second protocol.

* * * * *